United States Patent
Cheng et al.

(10) Patent No.: US 6,226,301 B1
(45) Date of Patent: May 1, 2001

(54) METHOD AND APPARATUS FOR SEGMENTATION AND ASSEMBLY OF DATA FRAMES FOR RETRANSMISSION IN A TELECOMMUNICATIONS SYSTEM

(75) Inventors: Mark W Cheng, Colleyville, TX (US); Zhi-Chun Honkasalo, Vantaa (FI)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/025,829

(22) Filed: Feb. 19, 1998

(51) Int. Cl.[7] .............................. H04J 11/00; H04J 3/16; H04J 3/22; H04B 7/216; H04L 1/18
(52) U.S. Cl. .................... 370/474; 370/320; 370/342; 370/471; 370/209; 714/748; 714/749
(58) Field of Search ................................. 370/474, 465, 370/469, 346, 349, 445, 461; 371/32, 33, 34, 30; 709/227, 231, 230, 249

(56) References Cited

U.S. PATENT DOCUMENTS

| | | | |
|---|---|---|---|
| 5,444,718 | * 8/1995 | Ejzak et al. | 371/32 |
| 5,572,678 | * 11/1996 | Homma et al. | 395/200.12 |
| 5,701,298 | * 12/1997 | Diachina et al. | 370/346 |
| 5,896,402 | * 4/1999 | Kurobe et al. | 371/32 |
| 5,963,559 | * 10/1999 | Ohki | 370/445 |
| 6,076,181 | * 6/2000 | Cheng | 714/748 |
| 6,097,731 | * 8/2000 | Aoki | 370/465 |

* cited by examiner

Primary Examiner—Huy D. Vu
Assistant Examiner—M. Phan
(74) Attorney, Agent, or Firm—Brian T. Rivers

(57) ABSTRACT

A method and apparatus for segmentation and assembly of data frames for retransmission in a telecommunications system. Zero padding of radio link protocol (RLP) data frames carrying retransmissions is minimized. RLP data frames carrying retransmitted data of an RLP data frame may also carry at least one newly transmitted RLP data frame or at least one other complete or partial retransmitted RLP data frame. The RLP data frames are passed to a lower level protocol and transmitted in at least one transmission frame.

12 Claims, 3 Drawing Sheets

METHOD AND APPARATUS FOR SEGMENTATION AND ASSEMBLY OF DATA FRAMES FOR RETRANSMISSION IN A TELECOMMUNICATIONS SYSTEM

FIELD OF THE INVENTION

This invention relates to telecommunications systems, and, more particularly, to a method and apparatus for segmenting and assembling data frames for retransmission in a telecommunications system.

BACKGROUND OF THE INVENTION

Major cellular telecommunications system types include those operating according to the Global Services for Mobile (GSM) Standard, the TIA/EIA/IS-95 Mobile Station-Base Station Compatibility Standard for Dual Mode Wide Band Spread Spectrum Cellular Systems (IS-95), the TIA/EIA/IS-136 Mobile Station-Base Station Compatibility Standard (IS-136), and the TIA/EIA 553 Analog Standard (AMPS/TACS). Other major cellular systems include those operating in the personal communications system (PCS) band according to the IS-95 based ANSI-J-STD-008 1.8–2.0 GHz standard or those operating according to the GSM based PCS1900 (1900 MHz frequency range) standard.

Currently, each of the major cellular system standards bodies is implementing data services into its digital cellular specifications. A data service specification has been finalized for GSM, and data service specifications compatible with the IS-95 and IS-136 standards are being prepared. The IS-95 data service standard is contained in the TIA/EIA document, "Data Service Options for Wideband Spread Spectrum Systems," PN-3676.1-PN-3676.6, which is to be published as TIA/EIA/IS-707.1-TIA/EIA/IS-707.6 (IS-707).

In an IS-707 based system, a radio link protocol (RLP) is utilized to provide an octet stream service over IS-95 forward and reverse traffic channels. The RLP is defined in Section IS-707.2 of IS-707. Each octet of the RLP comprises 8 bits of digital data. The octet stream service carries the variable length data packets of the point-to-point protocol layer. The RLP divides the point-to-point protocol packets into IS-95 traffic channel frames for transmission. The IS-95 traffic channel frames form the physical layer transmission frames. There is no direct relationship between point-to-point protocol packets and IS-95 frames. A large packet may span several IS-95 traffic channel frames, or a single traffic channel frame may include all or part of several point-to-point packets. The RLP does not take the higher level traffic channel framing into account but operates on a featureless octet stream, delivering the octets to the IS-95 multiplex sublayer for transmission in the order the octets are received from the point-to-point layer. The data may be transmitted on the traffic channel as primary traffic or, for example, along with speech, as secondary traffic. The IS-707 RLP generates and supplies one frame to the IS-95 multiple sublayer every 20 msec. The size of the RLP frame depends on the type of transmission frame available for transmitting the RLP frame.

The RLP utilizes RLP control frames to control the transmission of data and RLP data frames for the transmission of data at the RLP level.

The format of RLP control and data frames is defined so that each RLP frame includes an 8-bit sequence number field (SEQ). Each RLP data frame SEQ field contains the sequence number of that particular data frame. The sequence numbers are used to identify each received data frame and allow determination of data frames that have not been received. The RLP control frame SEQ field is not used to indicate the sequence number of the control frame but contains the next data frame sequence number to allow quick detection of erased data frames.

Each RLP data frame includes a number of data bits, with a maximum number of data bits allowed for each frame. The maximum number of data bits allowed in a data frame depends upon the IS-95 multiplex subchannel used and the transmission frame available. The range can vary. For example, for primary traffic on the traffic channel, using multiplex option 2 at IS-95 full rate, the maximum number of data bits allowed is 266; and for primary traffic on the traffic channel using multiplex option 1 at IS-95 half rate, the maximum number of data bits allowed is 80. When fewer than the maximum number of bits are transmitted in a frame, padding is used to fill out the data field. Each RLP data frame also includes an RLP frame type (CTL) field and a data length (LEN) field. The LEN field indicates the length of the data in the frame in octets. For unsegmented data frames, the CTL frame is one bit and is set to 0. For segmented data frames, the CTL frame contains 4 bits and can be set to indicate whether the data in the frame includes the first LEN octets, the next LEN octets, or the last LEN octets of the segmented data frame.

The RLP control frame may function as a negative acknowledgment (NAK) RLP control frame to request retransmission of unreceived data frames. An NAK RLP control frame includes a 4-bit frame type (CTL) field, a 4-bit length (LEN) field, an 8-bit FIRST field, an 8-bit LAST field, a reserved field (RSVD), a frame check sequence field (FCS) and padding. An RLP control frame having the frame type field set to indicate negative acknowledgment (NAK) may then be used to request retransmission of a particular data frame or a particular sequence of data frames. For example, a mobile station expecting a data frame having a particular sequence number would transmit an NAK control frame to the base station if the mobile determined that the data frame was missed from the sequence numbers of received RLP frames. The FIRST and LAST fields of the RLP NAK control frame are used to indicate the particular data frame or sequence (indicated as a range beginning at the sequence number indicated by the FIRST field and ending at the sequence number indicated by the LAST field) of data frames that are requested to be retransmitted. In IS-707, the number of requests for retransmission of a data frame is a set number and the initiation of subsequent requests for retransmission after the initial NAK control frame is sent is controlled by an NAK retransmission timer. When RLP frames are carried as primary or secondary traffic, the retransmission timer is implemented as a frame counter. The NAK retransmission counter for a data frame is started upon the transmission of an NAK RLP control frame requesting retransmission of that data frame.

If the data frame has not arrived at the receiver when its NAK retransmission timer expires, the receiver sends a second NAK control frame requesting retransmission of that data frame. This NAK control frame is transmitted twice. The NAK retransmission timer for this data frame is then restarted. If the data frame has not arrived at the receiver when its NAK retransmission timer has expired twice, the receiver sends a third NAK control frame requesting retransmission of that data frame. Each NAK control frame transmitted as the result of a retransmission timer expiring a second time is transmitted three times.

An NAK abort timer is then started in the receiver upon transmission of the third NAK control frame. The NAK abort timer is implemented and expires identically to the NAK retransmission timer. If the data frame has not arrived at the receiver when its NAK abort timer has expired, the NAK is aborted and no further NAK control frames are transmitted for that data frame.

The IS-707 NAK retransmission scheme results in a maximum number of three retransmission requests that include a maximum number of six NAK RLP control frames being transmitted for a particular unreceived data frame.

If the size of a frame to be retransmitted exceeds the number of data octets available in the IS-95 traffic channel frame at the time of retransmission, the IS-707 retransmission scheme provides for the segmentation of retransmitted RLP data frames. The IS-707 retransmission scheme is designed so that a retransmitted RLP data frame may be sent in appropriate data frames up to three segments. Each segment is sent as a segmented RLP data frame in a separate IS-95 traffic channel frame. No reassembly with other RLP frames is performed in the transmitter. The segments are divided, if necessary, sent in segmented RLP data frames, and reassembled at the receiver.

If the size of an RLP data frame to be retransmitted is smaller than the number of data octets available in the IS-95 traffic channel frame at the time of retransmission, the extra octets in the RLP data frame are padded with zeros to fill out the IS-95 traffic channel frame. Because the largest number of bits available in an IS-95 traffic channel frame is 266 bits, the system can accept this loss of overhead.

In proposed third generation CDMA systems a much wider range of frame types may be used to carry data traffic as compared to an IS-95/IS-707 based system. For example, third generation CDMA systems have been proposed that may use a fundamental channel and one or more supplemental channels to carry data traffic. The fundamental traffic channel and each of the supplemental traffic channels may use a wide range of different physical layer transmission frame types and sizes. Those third generation systems may transmit at much higher data rates than an IS-95/IS-707 based system. Because of a larger range in physical layer transmission frame size, a retransmitted RLP data frame may be much smaller than the space available in the physical layer transmission frame used to send the RLP data frame. When a retransmitted frame size is much smaller than the frame size available for retransmission, padding the unused portion of the frame may cause a very large waste of bandwidth and may not be an acceptable solution, as it was for IS-95/IS-707. For example, if the largest transmission frame carried 2000 bits and the smallest transmission frame carried 200 bits, as has been proposed, retransmission of an RLP frame originally carried in a small transmission frame would result in a waste of 1800 bits or 90% of the frame, if zero padding were used.

OBJECTS OF THE INVENTION

It is an object of this invention to provide a method and apparatus for segmenting and assembling data frames for retransmission in a telecommunications system that overcomes the foregoing and other problems.

Another object of this invention is to provide a method and apparatus for segmenting and assembling data frames for retransmission which maximizes use of the resources available for retransmission of data frames.

Another object of this invention is to provide a method and apparatus for segmenting and assembling data frames for retransmission in which zero padding of frames available for carrying retransmission is minimized, reducing waste of available bandwidth.

A further object of this invention is to provide a method and apparatus for segmenting and assembling data frames for retransmission in which a transmission frame carrying retransmitted data may also carry data from at least one newly transmitted or retransmitted RLP frame.

SUMMARY OF THE INVENTION

The present invention provides a method and apparatus for segmenting and assembling radio link protocol (RLP) data frames for retransmission in a telecommunications system. The method and apparatus maximizes use of the resources available for retransmission of data frames. In the method and apparatus, zero padding of frames available for carrying retransmissions is minimized, and waste of available bandwidth is reduced by creating and formatting RLP frames that maximize the amount of data included in an RLP data frame sent to a lower level protocol layer for transmission. The method and apparatus also allows an RLP frame carrying retransmitted data of an RLP data frame to carry data from at least one newly transmitted or at least one other retransmitted RLP frame.

In an embodiment of the invention, the method and apparatus is implemented in a system having physical layer (L1) transmission frames that each include a number of data bits to carry an RLP frame. The data bits of L1 transmission frame may range from a number, n, for the smallest size transmission frames to a number of bits, nx, for the largest size L1 transmission frames. The method and apparatus is utilized when an RLP frame is retransmitted from a sending transceiving device to a receiving transceiving device. The transceiving devices may be a sending mobile station and a receiving base station, or sending base station and receiving mobile station. The RLP uses a negative acknowledgment (NAK) retransmission scheme. When an RLP frame is not received, a first retransmission request (NAK) is transmitted from the receiving device, and an NAK timing procedure is initiated in the receiving device. If the retransmitted RLP frame is not received from the sending device within the time in which the NAK timing procedure expires, the receiving device initiates an NAK timeout procedure.

When a request for retransmission of an RLP data frame is received by the sending device, the sending device will process the unreceived RLP data frame (NAK frame) for retransmission. The NAK frame may be retransmitted in either an unsegmented RLP data frame or a segmented RLP data frame. An unsegmented RLP data frame is transmitted as part of an assembled RLP data frame. A segmented RLP data frame may be transmitted alone or as part of an assembled RLP data frame. An assembled RLP data frame may include one or more complete or partial NAK frames and may also include RLP data to be newly transmitted.

In the embodiment, the process fills each L1 transmission frame as efficiently as possible. At the beginning of a time period equal to the duration of an L1 transmission frame, the RLP data queue is checked for RLP data to fill the next available (current) L1 transmission frame. Because NAK requests have priority, any RLP data frames to be retransmitted or remaining segments of RLP data frames to be retransmitted will be first in the RLP data queue. The NAK frame that includes the first group of bits (NAK bits) that all belong to the same NAK frame is the first NAK frame in the queue. The NAK bits of the first NAK frame in the queue may include all the bits of the first NAK frame, or bits comprising only remaining segments of the NAK frame that could not be placed in an RLP frame for transmission in a previous L1 transmission frame.

If no NAK bits are in the RLP data queue, a new RLP frame is created and sent to the L1 layer for transmission in the current L1 transmission frame and the retransmission process ends. If NAK bits are found in the RLP data queue, the current L1 transmission frame capacity is checked to see if capacity exists to include all the NAK bits from the first NAK frame in the queue in the RLP frame to be sent to the L1 layer for transmission in the current L1 transmission frame. If the current L1 transmission frame does not have capacity to include all the NAK bits from the first NAK frame in the queue in the current L1 transmission frame, the NAK bits are segmented and a segment of the NAK frame is placed in a segmented RLP data frame for transmission in the current L1 transmission frame. The segmented RLP data frame is then passed to the L1 layer for transmission in the current L1 transmission frame.

If the current L1 transmission frame does have capacity to include all the NAK bits from the first NAK frame in the queue, an assembled RLP data frame is created. The NAK bits from the first NAK frame in the queue are then formatted into an unsegmented RLP data frame or segmented RLP data frame and placed in the assembled RLP data frame. The unsegmented RLP data frame will be formatted when the NAK bits comprise all the bits belonging to the first NAK frame in the queue. The segmented RLP data frame is formatted when the NAK bits comprise all the remaining bits belonging to a segment of the first NAK frame in the queue, because previous segments of the first NAK frame in the queue were placed in an RLP frame for transmission in previous L1 transmission frames.

If a number of available bits greater than a predetermined threshold still exist in the assembled RLP data frame, the process will begin again for the next bits in the queue. If there are not a number of available bits in the current L1 transmission frame greater than the threshold, any unused bits will be padded with zeros and the current L1 transmission frame will be passed to the L1 layer.

If the process is continued for the next bits in the queue, the next bits will be placed in the assembled RLP data frame to maximize utilization of the available capacity. If the process is continued for the next bits and the next bits comprise an NAK frame and the assembled RLP data frame does not have available capacity for all bits of the NAK frame, the NAK frame is formatted as a segmented RLP data frame and placed in the assembled RLP data frame. If the next bits are data to be transmitted for the first time, these bits will be formatted as a segmented RLP data frame and placed in the assembled RLP data frames. The assembled RLP data frame is then passed to the L1 layer for transmission in the current L1 transmission frame.

If the process is continued and the next bits comprise an NAK frame and the assembled RLP frame has available capacity for all bits of the NAK frame, the NAK frame is formatted as an unsegmented data frame and placed in the assembled RLP data frame. The process may then be repeated for the next bits in the queue until the capacity of assembled RLP data frame falls below the predetermined threshold, and then the assembled RLP data frame is passed to the L1 layer for transmission in the current L1 transmission frame.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
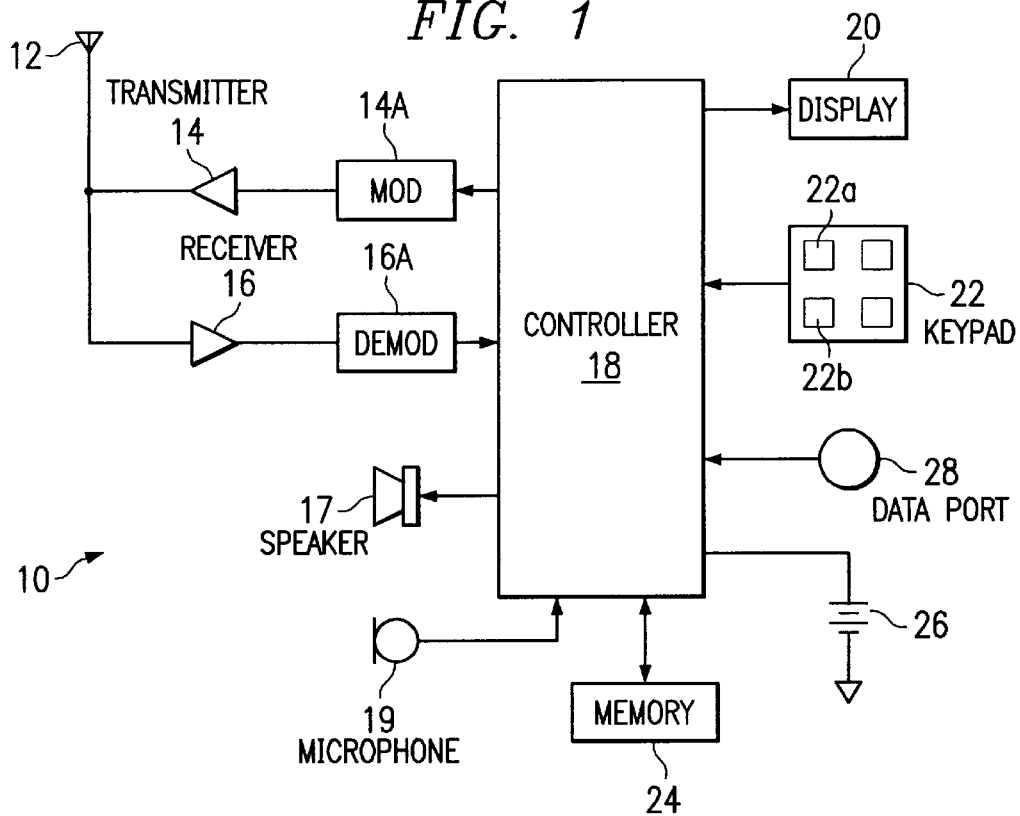
FIG. 1 is a block diagram of a cellular terminal that is suitable for practicing this invention.
Figure 2:
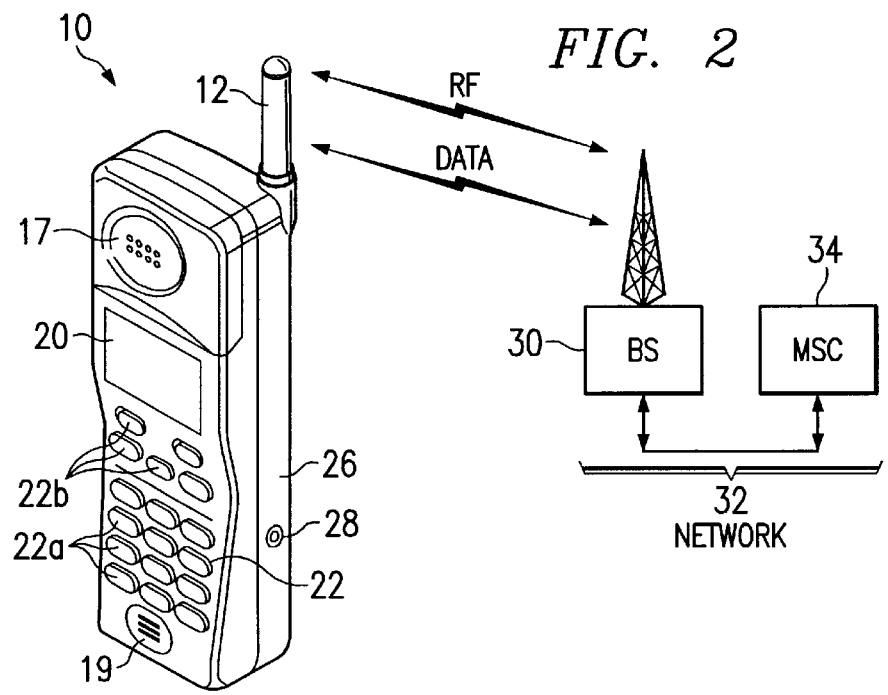
FIG. 2 depicts the terminal of FIG. 1 in communication with a CDMA cellular network.

Referring now to FIGS. 1 and 2, therein are illustrated a wireless user terminal or mobile station (MS) 10 and cellular network 32 that is suitable for practicing this invention. The mobile station 10 includes an antenna 12 for transmitting signals to and receiving signals from a base site or base station (BS) 30. The (BS) 30 is a part of cellular network 32 that includes a mobile switching center (MSC) 34. The MSC 34 provides a connection to landline trunks when the MS 10 is involved in a call.

The MS 10 includes a modulator (MOD) 14A, a transmitter 14, a receiver 16, a demodulator (DEMOD) 16A, and a controller 18 that provides signals to and receives signals from modulator 14A and demodulator 16A, respectively. These signals may include signaling information and also speech, data and/or packet data transmitted between MS 10 and BS 30 in accordance with the air interface standard of the applicable cellular system.

Controller 18 may be comprised of a digital signal processor device, a microprocessor device, and various analog-to-digital converters, digital-to-analog converters, and other support circuits. The control and signal processing functions of the mobile station are allocated between these devices according to their respective capabilities. MS 10 also includes a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#, *) 22a, and other keys 22b used for operating the mobile station 10. These other keys 22b may include, for example, a SEND key, various menu scrolling and soft keys, and a PWR key. The mobile station 10 may also include a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store data prior to transmission or after reception. The memory 24 also includes routines for implementing the method of radio link protocol (RLP) data frame retransmission according to the described embodiment of the invention.

Mobile station 10 may also function as a data terminal for transmitting or receiving packet data. As such, in this case MS 10 may be connected to a portable computer or a fax machine through a suitable data port (DP) 28.

BS 30 also includes the necessary transmitters and receivers to allow signal exchange with MS 10. Controllers, processors and associated memories that may be located in BS 30 or MSC 34 provide control of BS 30 and MSC 34 and implement routines for the method and apparatus of RLP data frame retransmission according to the described embodiment of the invention.

In the embodiment of this invention MS 10 and network 32 operate using a direct spread, code division multiple access (DS-CDMA) system that may be based on the IS-95 system standard. The network may operate in the 800 MHz frequency range or in the 1.8–2.0 GHz range. The network may provide a service option feature based on the IS-707 data service standard and may also use high speed data techniques that have been proposed for CDMA-based systems to provide higher speed data transmission than is presently provided by the present IS-95 and IS-707 standards.

For example, the method and apparatus may be implemented in a system in which parallel fundamental and supplemental CDMA code channels are used to carry parallel data transmissions for high speed data, with the physical layer (L1) transmission frame sizes of the largest size being x times longer than the smallest frames, i.e., the largest physical layer transmission frames may carry x times the number of data bits carried in the smallest frames. The invention avoids the waste of bandwidth that would occur if an RLP frame which originally was carried in a small L1 transmission frame is transmitted in the largest L1 transmission frame with zero padding in the bits not utilized.

Referring now to FIGS. 3, 4, 5A and 5B, therein are pictorial representations of RLP data frame structures utilized in the embodiment of the invention. In accordance with the invention, three new RLP data frame types are introduced into the retransmission procedure. The embodiment utilizes a segmented RLP data frame structure, such as utilized in IS-707, along with a new assembled RLP data frame structure, a new segmented RLP data frame structure that may be included in the assembled RLP data frame, and a new unsegmented RLP data frame structure that may be included in the assembled RLP data frame, to provide a method and apparatus in accordance with the invention.

Figure 3:
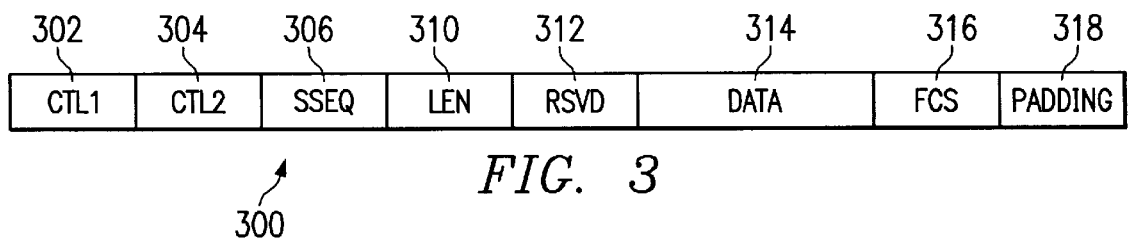
FIG. 3 is a pictorial representation of an RLP segmented data frame structure utilized for retransmission according to the invention.

FIG. 3 is a pictorial representation of an RLP segmented data frame structure employed in accordance with the invention. Segmented data frame 300 includes RLP frame type (CTL1) field 302, segment number (CTL2) field 304, RLP data frame send sequence number (SSEQ) field 306, data length (LEN) field 310, Reserved (RSVD) field 312, Data field 314, Frame Check Sequence (FCS) field 316, and Padding field 318.

CTL1 field 302 may be set to 100 to indicate that the frame is a segmented data frame. CTL2 field 304 may be set to the number of the segment for the retransmitted data frame, i.e., CTL2 field 304 identifies the segments of the retransmitted data frame. SSEQ field 306 may be set to the sequence number of the retransmitted data frame to which the sequence belongs. LEN field 310 may be set to indicate the length in octets of data field 314. RSVD field 312 may be used to pad bits to allow data field 314 to start at the next available octet after LEN field 310. FCS field contains a frame check sequence for data bits in data field 314. Padding field 318 may be used to fill out an L1 transmission frame if the last segment of a retransmitted RLP frame does not fill the L1 transmission frame.

Figure 4:
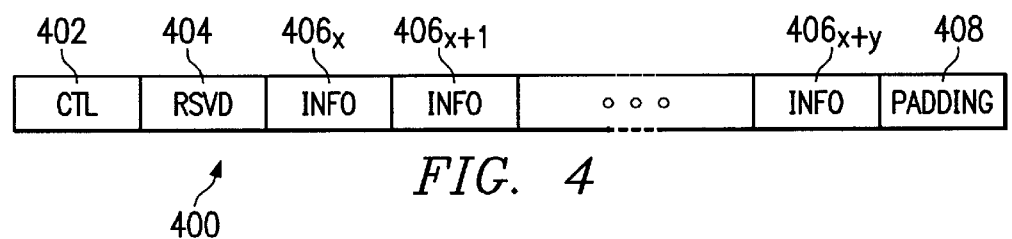
FIG. 4 is a pictorial representation of an assembled RLP data frame utilized for retransmission according to the invention.
Figure 5A:
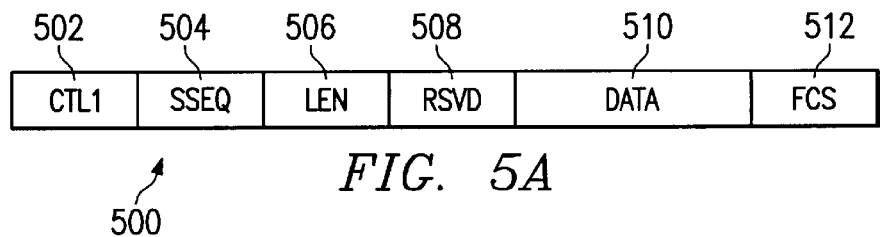
FIG. 5A is a pictorial representation of an unsegmented RLP data frame utilized in the assembled RLP data frame of FIG. 4.

FIG. 4 is a pictorial representation of an assembled RLP data frame utilized for retransmission in accordance with the invention. Assembled data frame 400 includes RLP frame type (CTL) field 402, reserved (RSVD) field 404, data (INFO) fields $406_x$–$406_{x+y}$, and padding bits field 408. CTL field 402 may be set to 101 to indicate an assembled data frame. RSVD field 404 may be used to pad bits to allow the INFO field $406_x$ to start at the next available data octet after CTL field 402. The INFO fields $406_x$–$406_{x+y}$ are a variable number of variable length fields. Each INFO field from INFO field $406_{x+y-1}$ to INFO field $406_{x+1}$ is an unsegmented RLP data frame as shown in FIG. 5A. The first and last INFO fields $406_x$ and $406_{x+y}$ may be either an unsegmented RLP data frame as shown in FIG. 5A or a segmented RLP data frame as shown in FIG. 5B.

FIG. 5A is a pictorial representation of an unsegmented data frame that may be utilized in the assembled data frame of FIG. 4. Unsegmented data frame 500 includes RLP frame type (CTL) field 502, RLP data frame send sequence number (SSEQ) field 504, length (LEN) field 506, reserved (RSVD) field 508, data field 510 and frame check sequence (FCS) field 512. In unsegmented data frame 500, CTL field 502 may be set to 0 to indicate an unsegmented data frame. SSEQ field 504 may be set to the sequence number of the unreceived RLP data frame that is being retransmitted. LEN field 506 is set to indicate the length in octets of data field 510. RSVD field 508 is used to pad bits to allow data field 510 to start at the next available octet after LEN field 506. FCS field 512 contains the frame check sequence. FCS field 512 is 8, 16, 24 or 32 bits long, depending on the length of data field 510.

Figure 5B:
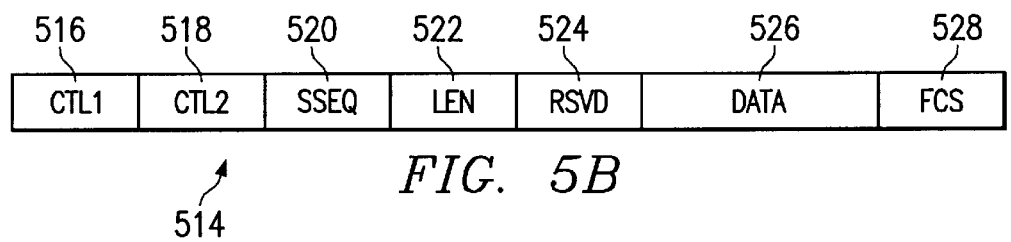
FIG. 5B is a pictorial representation of a segmented RLP data frame utilized in the assembled RLP data frame of FIG. 4.

FIG. 5B is a pictorial representation of a segmented data frame that may be utilized in the assembled data frame of FIG. 4. Segmented data frame 514 includes RLP frame type (CTL1) field 516, segment number (CTL2) field 518, RLP data frame sequence number (SSEQ) field 520, data length (LEN) field 522, reserved (RSVD) field 524, data field 526 and frame check sequence (FCS) field 528. CTL1 field 516 may be set to 100 to indicate a segmented data frame. CTL2 field 518 may be set to the number of the segment for the retransmitted data frame, i.e., CTL2 field 518 identifies the segments of the retransmitted data frame. SSEQ field 520 may be set to the sequence number of the retransmitted data frame to which the segment belongs. LEN field 522 may be set to indicate the length in octets of data field 526. RSVD field 524 may be used to pad bits to allow data field 526 to start at the next available octet after LEN field 522. FCS field 528 may contain the frame check sequence for the data bits in data field 526.

Figure 6:
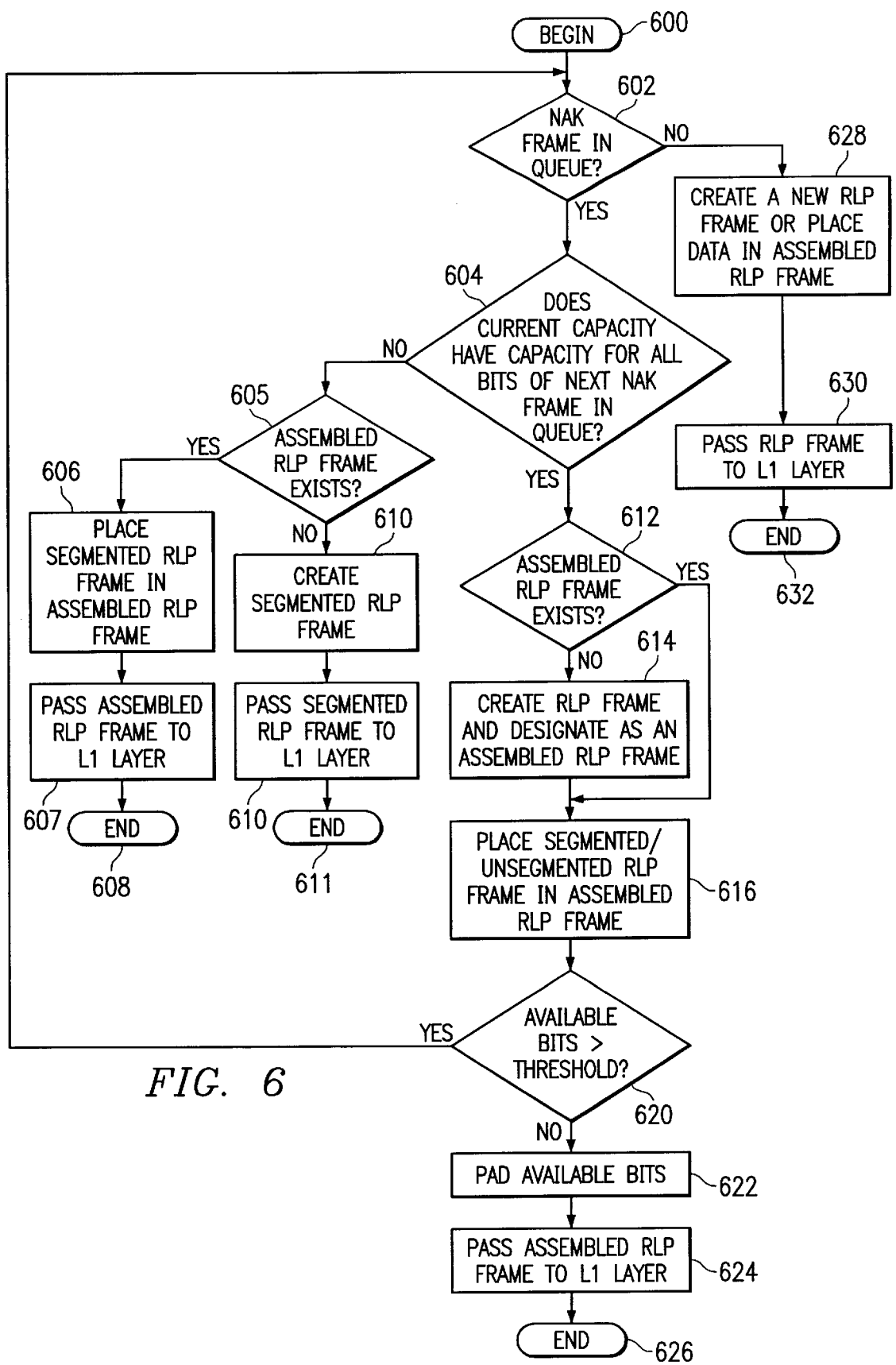
FIG. 6 is a flow diagram illustrating the RLP data frame retransmission procedure according to the invention.

Referring now to FIG. 6, therein is a flow diagram illustrating the RLP data frame retransmission procedure according to the invention. FIG. 6 illustrates steps performed in the retransmission procedure for every L1 frame transmission period when an L1 transmission frame becomes available to the RLP layer. The process packs data from the RLP data queue as efficiently as possible into the capacity available for an L1 transmission frame. The procedure may be performed within either mobile station 10, for mobile-to-network transmissions, or base station 30 or MSC 34, for network-to-mobile transmissions, when the RLP is formatting data for the L1 transmission frames. In the embodiment, a negative acknowledgment (NAK) timing procedure places RLP data frames to be retransmitted (NAK frames) in an RLP queue.

The process begins at step 600, when an L1 transmission frame becomes available to the RLP layer and the RLP layer receives an indication as to what size RLP frame should be sent to the L1 layer, i.e., what the available RLP capacity in the next L1 frame is for an RLP frame. The process then moves to step 602. The process may also enter step 602 from step 620 of a previous iteration of the process of FIG. 6. In this case an assembled RLP data frame will already have been created and will have available capacity as will be explained in regard to FIG. 6. At step 602, a determination is made as to whether or not a complete or partial NAK frame is in the RLP queue for transmission. If it is determined that no NAK frame is in the RLP queue, the process moves to step 628. At step 628 a new RLP frame is created that includes data to be newly transmitted, or if an assembled RLP data frame was formatted in a previous iteration of FIG. 6, the data to be newly transmitted is placed in the assembled RLP data frame. Then at step 630 the new RLP frame or assembled RLP data frame is passed to the L1 layer for transmission in the current L1 transmission frame. The process then ends at step 632. If, however, at step 602 it is determined that an NAK frame is in the RLP queue for transmission, the process moves to step 604.

At step 604 a determination is made as to whether or not the currently available RLP capacity has capacity for all the bits of the first NAK frame in the queue. The currently available RLP capacity will initially be as received by the RLP layer at step 600. On subsequent iterations of the process, the currently available capacity may change, as the available RLP capacity specified in step 600 may be given to more than one NAK frame as the process of FIG. 6 is repeated for an L1 frame transmission period. If the currently available RLP frame does not have capacity for all the bits of the first NAK frame in the queue, the process moves to step 605. At step 605, it is determined whether an RLP frame already has been formatted as an assembled RLP data frame as assembled RLP data frame 400. The assembled RLP data frame may already have been created and formatted for the current L1 transmission frame if the process had already been performed for a previous NAK frame from the queue and available space was left from the available RLP capacity at the time the assembled RLP data frame was created.

If an assembled RLP data frame has not been formatted, the process moves to step 609. At step 609 a segmented RLP data frame is created and formatted as segmented RLP data frame 300. The segmented RLP data frame may be the first of segmented frames for one NAK frame, or the segmented RLP data frame may be one of a number of segmented frames that are transmitted after a first segmented RLP data frame is created for an NAK frame. If bits from the first NAK frame in the queue still remain after step 609, these bits will be processed for the next RLP frame to be sent to the L1 layer. Next, at step 610, the segmented RLP data frame is passed to the L1 layer. The process then ends at step 611. If, however, it is determined that an assembled RLP frame has been formatted for the current L1 transmission frame, the process moves to step 606.

At step 606 a segmented RLP data frame is created and formatted as segmented RLP data frame 514 and inserted into the next available INFO field of the assembled RLP data frame. The segmented RLP data frame 514 may be the first of segmented frames for one NAK frame, or the segmented RLP data frame may be one of a number of segmented frames that are transmitted after a first segmented RLP data frame is created for an NAK frame. Next, at step 607 the assembled RLP data frame is passed to the L1 layer. The process then ends at step 608.

If, however, at step 604 it is determined that the currently available RLP capacity has capacity for all the bits of the first NAK frame in the queue, the process moves to step 612. At step 612 it is determined whether an RLP frame already has been formatted as an assembled RLP data frame for the current L1 transmission frame. An assembled RLP data frame may already have been created and formatted, as assembled RLP data frame 400, if the process has already been performed for a previous NAK frame from the queue and available space was left from the available RLP capacity at the time the assembled RLP data frame was created.

If an assembled RLP data frame does not exist, the process moves to step 614. At step 614 an assembled RLP data frame is created. The assembled RLP data frame is created and formatted as assembled RLP data frame 400 of FIG. 4, ready to receive data bits in one or more INFO fields. The process then moves to step 616. If, however, at step 612 it is determined that an RLP frame has been formatted as an assembled RLP data frame, the process moves to step 616 without creating a new assembled RLP data frame.

At step 616 either a segmented or unsegmented RLP data frame is inserted into the next available INFO field of the assembled RLP data frame. A segmented RLP data frame, created and formatted as segmented RLP data frame 514, is inserted at step 616 when the RLP data being sent from the RLP data queue is the last segmented RLP data frame needed to carry the remaining data belonging to the first NAK frame in the queue. A segmented RLP data frame inserted at step 616 will be in the first INFO field $406_x$ of assembled RLP data frame 400. An unsegmented RLP data frame, created and formatted as unsegmented RLP data frame 500, is inserted at step 616 when the RLP data being sent from the RLP data queue is all the data belonging to the first NAK frame in the queue. The RLP data frame inserted at step 616 will fill an INFO field large enough for all bits of the first NAK frame in the queue. The process then moves to step 620.

At step 620 a determination is made as to whether or not a number of bits greater than a predetermined threshold value are available for the assembled RLP data frame 400. If a number of bits greater than the threshold value are available, the process will return to step 602, where the process will begin again in order to utilize any available RLP capacity from the initially available RLP capacity for the next NAK frame in the queue. If, however, the number of available bits is less than the threshold value, the process moves to step 622 where all remaining bits available in the L1 transmission frame for the assembled RLP data frame are padded with zeros in padding field 408. Next, the process moves to step 624. At step 624 the assembled RLP data frame is passed to the L1 layer. The process then ends at step 626.

In an alternative embodiment, it is also possible that a positive acknowledgment retransmission scheme be used. In this case the receiving device would acknowledge received RLP data frames by including an acknowledgment in RLP frames it transmitted to the sender. This would allow an NAK frame to be removed from the queue immediately if an acknowledgment was received. The acknowledgment of the received RLP data frames would be done by including a field (RSEQ) that included the SSEQ number of the last received RLP data frame in transmitted RLP data frames. This could be implemented by including the RSEQ field in segmented RLP data frame 300 and assembled RLP data frame 400.

The invention has application to various types of telecommunications systems. For example, the method and apparatus may be implemented in other types of digital telecommunications systems in which lower layer transmission frames may carry a variable number of data bits relative to a higher layer protocol. Accordingly, although the invention has been particularly shown and described with respect to preferred embodiments thereof, it will be understood by those skilled in the art that changes in form and details may be made therein without departing from the scope and spirit of the invention.

What is claimed is:

1. A method for retransmitting at least one data frame between a first transceiving device and a second transceiving device, said method comprising the steps of:
    determining first data, said first data to be retransmitted from said first transceiving device;
    determining second data, said second data to be transmitted from said first transceiving device;
    formatting an assembled frame, said assembled frame including a plurality of information fields;
    formatting a first data frame, said first data frame comprising an unsegmented frame, said unsegmented frame including said first data, wherein said first data comprises all data of a previously transmitted third data frame;
    formatting at least one second data frame, each of said at least one second data frame including data from said second data;
    inserting said first data frame comprising said unsegmented frame into a first information field of said plurality of information fields;
    inserting said at least one second data frame into at least one second information field of said plurality of information fields; and
    transmitting said assembled data frame to said second transceiving device.

2. A method for retransmitting at least one data frame between a first transceiving device and a second transceiving device, said method comprising the steps of:
    determining first data, said first data to be retransmitted from said first transceiving device;
    determining second data, said second data to be transmitted from said first transceiving device;
    formatting an assembled frame, said assembled frame including a plurality of information fields;
    formatting a first data frame, said first data frame comprising a segmented frame, said segmented frame including a segment of data from said first data, wherein said segment of data comprises less than all data of a previously transmitted third data frame;
    formatting at least one second data frame, each of said at least one second data frames including data from said second data;
    inserting said first data frame comprising said segmented frame into a first information field of said plurality of information fields;
    inserting said at least one second data frame into at least one second information field of said plurality of information fields; and
    transmitting said assembled data frame to said second transceiving device.

3. The method of claim 2, wherein said step of determining second data further comprises determining second data, said second data to be transmitted for the first time from said first transceiving device.

4. The method of claim 2, wherein said second data determined in said step of determining second data is to be retransmitted from said first transceiving device.

5. The method of claim 1, wherein said second data determined in said step of determining second data is to be transmitted for the first time from said first transceiving device.

6. The method of claim 1, wherein said second data determined in said step of determining second data is to be retransmitted from said first transceiving device.

7. An apparatus for retransmitting at least one data frame between a first transceiving device and a second transceiving device, said apparatus comprising:
    an input device for receiving input data;
    a controller coupled to said input device, said controller for receiving and storing said input data, said controller further for determining first and second data from said input data stored in said controller, said first data to be retransmitted from said first transceiving device and said second data to be transmitted from said first transceiving device, wherein said controller formats an assembled frame, said assembled frame including a plurality of information fields and formats a first data frame, said first data frame comprising an unsegmented frame including said first data, wherein said first data comprises all data of a previously transmitted third data frame, said controller further for formatting at least one second data frame, each of said at least one second data frame including data from said second data, inserting said first data frame comprising said unsegmented frame into a first information field of said plurality of information fields, and inserting said at least one second data frame into at least one second information field of said plurality of information fields, and;
    a transmitter coupled to said controller, said controller for transmitting said assembled frame to the second transceiving device.

8. The apparatus of claim 7, wherein said second data determined in said step of determining second data is to be transmitted for the first time from said first transceiving device.

9. The apparatus of claim 7, wherein said second data determined in said step of determining second data is to be retransmitted from said first transceiving device.

10. An apparatus for retransmitting at least one data frame between a first transceiving device and a second transceiving device, said apparatus comprising:

an input device for receiving input data;

a controller coupled to said input device, said controller for receiving and storing said input data, said controller further for determining first and second data from said input data stored in said controller, said first data to be retransmitted from said first transceiving device and said second data to be transmitted from said first transceiving device, wherein said controller formats an assembled frame, said assembled frame including a plurality of information fields and formats a first data frame, said first data frame comprising an unsegmented frame including said first data, wherein said first data comprises all data of a previously transmitted third data frame, said controller further for formatting at least one second data frame, each of said at least one second data frame including data from said second data, inserting said unsegmented data frame into a first information field of said plurality of information fields, and inserting said at least one second data frame into at least one second information field of said plurality of information fields, and;

a transmitter coupled to said controller, said controller for transmitting said assembled frame to the second transceiving device.

11. The apparatus of claim 10, wherein said second data determined in said step of determining second data is to be transmitted for the first time from said first transceiving device.

12. The apparatus of claim 10, wherein said second data determined in said step of determining second data is to be retransmitted from said first transceiving device.

* * * * *